(12) United States Patent
Lee

(10) Patent No.: US 7,244,456 B2
(45) Date of Patent: Jul. 17, 2007

(54) MUSHROOM WINE

(76) Inventor: In Sung Lee, 5 Kenneth Ave. Unit #1206, Toronto, Ontario (CA) M2N 6M7

( * ) Notice: Subject to any disclaimer, the term of this patent is extended or adjusted under 35 U.S.C. 154(b) by 0 days.

(21) Appl. No.: 11/163,553

(22) Filed: Oct. 22, 2005

(65) Prior Publication Data

US 2007/0092601 A1    Apr. 26, 2007

(51) Int. Cl.
*C12C 11/00* (2006.01)
(52) U.S. Cl. .............. 426/11; 426/13; 426/15; 426/60
(58) Field of Classification Search .......... 426/11, 426/15, 13, 60
See application file for complete search history.

(56) References Cited

U.S. PATENT DOCUMENTS 2,847,308 A * 8/1958 Bersworth et al. .......... 426/271

FOREIGN PATENT DOCUMENTS

| CN | 8703266 A | * | 11/1988 |
| CN | 1092808 A | * | 9/1994 |
| CN | 1244577 A | * | 2/2000 |
| CN | 1366032 A | * | 8/2002 |
| CN | 1583997 A | * | 2/2005 |
| JP | 57208983 A | * | 12/1982 |
| JP | 57208983 A2 | | 12/1982 |
| JP | 59045871 A | * | 3/1984 |
| JP | 60019489 A | * | 1/1985 |
| JP | 64071473 A | * | 3/1989 |
| JP | 01120273 A | * | 5/1989 |
| JP | 2001190252 A | * | 7/2001 |
| JP | 2002171957 A | * | 6/2002 |

OTHER PUBLICATIONS www.ebrew.com, Ten Steps to Good Wine, Dec. 21, 2001, Website, pp. 4.□□Web Posting Date verified using www.archive.org.*
www.joyofwine.net, Joy of Home Winemaking, Oct. 18, 2000, Website, pp. 4.□□Web Posting Date verified using www.archive.org.*
www.homebrewit.com, Glossary definition of Racking, Mar. 1, 2003, Website, pp. 2.□□Web Posting Date verified using www.archive.org.*
www.goldengourmetmushrooms.com, Enoki, Aug. 18, 2001, Website, pp. 5.□□Web Posting Date verified using www.archive.org.*
www.winemaking.jackkeller.net, Banana Wine (3), Apr. 8, 2001, Website, pp. 2.□□Web Posting Date verified using www.archive.org.*
www.winemaking.jackkeller.net, Banana Wine[Spiced] (2), Mar. 2, 2001, Website, pp. 2.□□Web Posting Date verified using www.archive.org.*
www.scorpius.spaceports.com, Apple Wine, Jul. 10, 2004, Website, pp. 3.□□Web Posting Date verified using www.archive.org.*
Pesgens, M. The Home Winemaking Book, 2000. Retrieved from the internet: <http://www.geocities.com/mipeman/download/thwb.pdf>.
Okamura, T. et al. "Characteristics of Wine produced by mushroom fermentation" Biosci. Biotechnol. Biochem. 2001, vol. 7, pp. 1596-1600.

* cited by examiner

*Primary Examiner*—Keith Hendricks
*Assistant Examiner*—Jyoti Chawla
(74) *Attorney, Agent, or Firm*—JHK Law; Joseph Hyosuk Kim

(57) ABSTRACT

The present application discloses a process for making mushroom wine.

20 Claims, No Drawings

MUSHROOM WINE

BACKGROUND OF THE INVENTION

1. Field of the Invention

The present invention relates to a process for the production of mushroom wine.

2. General Background and State of the Art

Mushrooms, like other fungi, stand apart from other plants by their lack of leaves, chlorophyll, flowers, and roots. So they cannot make their own food by the process known as photosynthesis. Therefore, they are obliged to draw nutrition from existing organic materials, and thus they attach themselves to a wide variety of objects such as living or dead plants, or even animals.

They provide moderate amounts of minerals (calcium, iron, phosphorus, potassium, and selenium) along with modest amounts of vitamin Bs (thiamine, riboflavin, and niacin) and vitamin C. Extremely low in calories, mushrooms are fat-free. Because of mushrooms' high concentration of glutamic acid—the naturally occurring form of monosodium glutamate (MSG)—mushrooms are natural flavor enhancers in many dishes.

Studies have shown that mushrooms may favorably influence the immune system, with potential benefits in fighting cancer, infections, and such autoimmune diseases as rheumatoid arthritis and lupus. This effect may be related to the high content of glutamic acid, an amino acid that seems to be instrumental in fighting infections, and enhancing other immune functions. Mushrooms also contain an array of compounds not found elsewhere in nature. For instance, antibiotics are derived from closely related organisms-molds.

There are five types of mushrooms with proven medicinal benefits: Enoki, Oyster, Reishi, Shiitake, and Tree ear.

A cultivated variety of velvet shank (Flammulina velutipes) is called Enoki mushroom or Enokitake. The delicate-tasting Enoki mushroom looks something like a pure white bean sprout with its long stem (up to 10 cm tall) and topped with a tiny snowy-white cap.

It looks very different from the wild variety which is orange-brown in colour with a shiny cap.

Enoki mushrooms are cultivated on stumps or in a sawdust medium, and are picked about 2 months after inoculation. Cultivated Enoki mushrooms are paler than those grown in the wild. The mushroom's white flesh is soft but resistant.

It has a fine, sweet and almost fruity flavor reminiscent of white pepper and lemon. This mushroom is sold commercially as Enokitake, Enokidake, or Enoki mushroom.

Some of the main chemical components of Enoki mushroom include protein, fiber, potassium, calcium, phosphorus, sodium, iron, niacin, thiamine, riboflavin and vitamin-D.

Therefore, there is a need in the art to make beverages such as wine that imparts nutritional and health benefits of mushroom.

SUMMARY OF THE INVENTION

In one aspect of the invention, the wine making process of the invention may follow the following steps:

(i) combining mushroom, warm water and sugar in a sterilized primary fermentor to form a mixture;

(ii) adding acidic substance to the mixture when the temperature of the mixture reaches room temperature;

(iii) allowing the mixture to stand for one or two days;

(iv) adding yeast or yeast culture to the mixture;

(v) stirring the mixture to add oxygen and release accumulated heat;

(vi) racking off lees of the wine into a sterilized secondary fermentor for anaerobic fermentation when the specific gravity reading reaches between 1.010 to 1.000, and anaerobically fermenting the wine; and (vii) racking the wine again at a specific gravity reading of 1.000 or less into another sterilized container.

In this process, the mushroom may be Enoki mushroom. And further, in step (i), the mushroom may be present in the mixture at about 0.1 Kg to about 0.4 Kg per liter of water, preferably about 0.1 Kg to about 0.35 Kg per liter of water, or about 0.14 Kg to about 0.32 Kg per liter of water. However, this may be varied as desired.

Further in the process, in step (i), the sugar may be included in the mixture at about 0.1 Kg to about 0.5 Kg per liter of water, preferably about 0.1 Kg to about 0.45 Kg, preferably about 0.13 Kg to about 0.47 Kg, or 0.19 Kg to about 0.47 Kg, or 0.19 Kg to about 0.36 Kg, or preferably about 0.25 to about 0.35 Kg per liter of water.

Boiled peeled banana may be optionally added to the mixture. The amount of the banana may be about 0.05 to about 0.15, preferably 0.07 to about 0.13 Kg per liter of water.

Ginger may also be added to the mixture in step (i). Ginger may be included at about 0.003 to about 0.015 per liter of water, preferably about 0.005 to about 0.01 Kg per liter of water.

In step (ii), the acidic substance may be citric juice such as lemon juice.

Further in step (ii), tannin or sulfur dioxide may be added to the mixture.

In another aspect of the invention, more sugar may be added to the mixture after step (v), until the specific gravity of the mixture reaches 1.030 to 1.020. The sugar may be added in repeated increments to achieve an increase in specific gravity of approximately 10 units each time.

In further other aspects of the invention if the wine is cloudy after two to three months after fermentation has ceased, a fining agent is added, and if the wine is too dry, sugar or syrup is added to the wine.

In another embodiment, the invention is directed to the wine produced by any of the above methods.

DETAILED DESCRIPTION OF THE INVENTION

In the present application, "a" and "an" are used to refer to both single and a plurality of objects.

As used herein, "fining agent" refers to adsorptive or reactive substance to reduce or remove the concentration of one or more undesirable components in the wine. Fining agents are used to achieve clarity and to improve color, flavor and physical stability. Fining agents can be grouped according to their chemical nature and mode of action, such as 1. Earths: bentonite; 2. Proteins: gelatin, isinglass, casein, albumen; 3. Polysaccharides: agars; 4. Carbons; 5. Synthetic polymers: PVPP; 6. Silicon dioxide (kieselsol); and 7. Others, including chelators and enzymes.

As used herein, "free-run wine" refers to the mushroom wine before undergoing pressing.

As used herein, "lees" refers to solids that result from fermentation, that are found on the bottom of the container.

As used herein, "stabilizing agent" refers to an agent that is added to the wine to eliminate the risk of microbial spoilage, to reduce the effects of oxidation, to ensure fermentation does not re-occur in sweet wine, and to maintain color stability and clarity throughout the aging process.

Exemplified ingredients of Enoki mushroom wine (for 23 liters/6 gallons of wine)

Fresh Enoki mushrooms: 3-6 Kg.
Sugar: 4-9 Kg
Water (purified): 19-21 liters.
Wine yeasts: 5-10 g.
Acids (tartaric, citric, or blended with tartaric/malic/citric acids): about 3.0-3.9 pH. If desired, lemon juice can be optionally substituted for acids.
Tannin (optional): 8.0-12.0 g.
Fining agent (optional) such as pectic enzyme (3-4 tsps), bentonite (2-3 tsps), and/or tannin.
Sulfur dioxide (optional): 30-100 ppm.
Stabilizers: Potassium sorbate (125-200 ppm), sulfur dioxide (50-100ppm), and/or wine conditioner (up to 250 ml).
Peeled banana (optional): 1.5-2.5 Kg.
Fresh ginger (optional): 100-200 g.

Process of winemaking

The process of making mushroom wine is described below, however, it is understood that a variation in the order of the steps is contemplated within the scope of the invention so long as mushroom wine is made. Further, the process exemplified here is directed to making about 23 liters or 6 gallons of wine, which can be scaled up or down as desired.

The lower tough parts (cluster base) of the fresh Enoki mushroom stem are trimmed and rinsed thoroughly. Any that have damp, slimy patches or that are discolored should be avoided.

The rinsed mushrooms are placed in a sterilized primary fermentor (vessel for aerobic fermentation) and then combined with warm water. By warm water, a person of skill in the art would understand it to mean a temperature that is of moderate heat in which sugar is dissolvable. However, in order to further define the warmness of the water, the range of temperature may be from about 38 degrees C. to about 42 degrees C. Sugar is dissolved in this mixture. Preferably, hot or boiling water is not used. The mushroom's flesh is soft but resistant. If the mushrooms are mixed with hot or boiling water, they become tough. Therefore the aroma and flavor can be lost and the extraction of some constituents may be hindered. The sugar may be dissolved all at once or dissolved several times by dividing the total sugar required to obtain higher alcohol content through efficient fermentation. In particular, the sugar to be used may be a fermentable sugar such as dextrose (corn sugar) or sucrose (beet or cane sugar). If the amount of sugar added is divided into stages, then a portion of the allocated amount of the sugar for the entire process may be added at the beginning and the rest may be added as necessary to achieve a desired specific gravity of the mixture or wine. Approximately ⅔ or ¾ of the total required sugar may be dissolved, and the rest can be added later. Thus, the total amount of sugar added to the mixture for the entire winemaking process may be from about 4 Kg to about 8 Kg for making ultimately 23 liters or 6 gallons of wine. In one embodiment of the invention, the sugar may be added in stages encompassed in later steps so that the specific gravity of the mixture is increased by about 10 units at each stage upon addition of the sugar. This process can be repeated several times by increasing approximately 10 points of the specific gravity each time. By "10 points" it is meant 0.01 in specific gravity units. It is understood that an effect of such incremental addition of sugar is a yield of about 20% alcohol by volume without adding any distilled spirits. The reference substance for measuring the specific gravity is water.

More sugar may be added to the mixture as desired in particular if sweet wine is desired to be produced.

To enhance the flavor and the amount of nutrients, peeled banana boiled in about 1 liter of water and/or freshly ground or grated ginger may be added if desired. Ginger contains volatile oils and oleoresin. They are responsible for ginger's characteristic odor and taste, and contain medically active constituents effective as for example antiemetic, carminative, circulatory stimulant, inhibits coughing, anti-inflammatory, and antiseptic. In addition to enhancing the flavor of wine, bananas are also very nutritious, being rich in potassium, magnesium, riboflavin, niacin, and vitamins C and B6.

When the mixture has cooled down to room temperature, acids or acidic substances such as lemon juice may be added to the mixture. Tannins and sulfur dioxide can be added if desired. In a preferred embodiment, the mixture is allowed to stand for one or two days, even if no sulfur dioxide is added.

Optionally, the specific gravity reading may be taken to measure the potential alcohol rate, and then the yeast or yeast culture is added. The fermentor should be covered to protect the mixture from any insect and dust and it may be kept between about 20 to about 30 degrees C. (65-85 degree F.).

The mixture should be stirred several times a day to introduce a limited amount of oxygen required by the growing population of yeasts during the vigorous primary fermentation and to release the accumulated heat created by the fermentation. And the cap (solid contents) which is formed on top of the mixture should be punched down.

When the specific gravity reading reaches between about 1.020 to about 1.010, the remainder of the sugar may be added to the mixture at different stages in the fermentation process. This process can be repeated several times by increasing approximately 10 points of the specific gravity each time. By "10 points" it is meant 0.01 in specific gravity units.

When the specific gravity reading reaches between 1.010-1.000 after four to ten days of vigorous primary fermentation, the wine should be racked off the lees into the sterilized secondary fermentor (vessel for anaerobic fermentation which is the slower fermentation, accomplished away from air).

The remaining mixture of wine and solids are pressed to release additional wine and the press wine is added to the free-run wine.

The airlock (also called fermentation lock) should be installed on the fermentor to protect the wine from contact with air while still allowing the carbon dioxide gas to escape. The airlock may be filled with water or sulfite solution to a little less than half full in each chamber.

During about two to three weeks of anaerobic fermentation, the wine may be allowed to stand at about 15 to about 20 degrees C., preferably at about 18 degrees C.

After about 2 to 3 weeks (at the specific gravity reading of 1.000 or less), the wine is racked into another sterilized container leaving behind lees and the container is fitted with an airlock.

If the container is not filled, it may be preferably filled with purified cool water, or water with sugar dissolved in it, or same kind of wine.

In about another one to two months, it can be racked again into another sterilized container to achieve a clear and clean-tasting wine. These steps can be repeated as many times as necessary in order to end up with the clearest wine possible.

Correctly made Enoki mushroom wine should not normally require clarification process. But if the wine remains cloudy after two to three months after fermentation has ceased, there is a possibility that it will not clear naturally. In this case, clarification process should be taken with an appropriate fining agent such as pectic enzyme, bentonite, and/or tannin into the wine. The cleared wine may be then racked off.

If the wine is too dry, it may be sweetened by adding more sugar either by dissolving some in a little of the wine, or by making a simple syrup and pouring it into the wine. Wine conditioner can also be added.

The wine should be stabilized by adding stabilizer, using centrifuge machine, or carrying out a sterilizing filtration process.

The wine may be aged in bulk for about one to three months in a cool and dark place.

The wine is bottled and aged in a cool and dark place.

At this point, the alcohol levels could be about 9-20% by volume. The wine is quite drinkable soon after bottling but improves with bottle aging in a cool place.

The amount of ethanol alcohol actually formed depends on the several factors including the amount of sugar, nutrient level of the materials (mushroom in this case), yeast species, and the general condition of fermentation. If the mixture is too rich with sugar, it may actually retard fermentation and clarification.

The present invention is not to be limited in scope by the specific embodiments described herein. Indeed, various modifications of the invention in addition to those described herein will become apparent to those skilled in the art from the foregoing description and accompanying figures. Such modifications are intended to fall within the scope of the appended claims. The following examples are offered by way of illustration of the present invention, and not by way of limitation.

Those skilled in the art will recognize, or be able to ascertain using no more than routine experimentation, many equivalents to the specific embodiments of the invention specifically described herein. Such equivalents are intended to be encompassed in the scope of the claims.

What is claimed is:

1. A process for the preparation of mushroom wine comprising the steps of:
   (i) combining fresh mushroom, warm water and sugar in a sterilized primary fermentor to form a mixture;
   (ii) adding acidic substance to the mixture when the temperature of the mixture reaches room temperature;
   (iii) allowing the mixture to stand for one or two days;
   (iv) adding yeast or yeast culture to the mixture;
   (v) stirring the mixture to add oxygen and release accumulated heat;
   (vi) racking off lees of the wine into a sterilized secondary fermentor for anaerobic fermentation when the specific gravity; and reading reaches between 1.010 to 1.000, and anaerobically fermenting the wine; and
   (vii) racking the wine again at a specific gravity reading of 1.000 or less into another sterilized container.

2. The process according to claim 1, wherein in step (i), the mushroom is present in the mixture at about 0.1 Kg to about 0.4 Kg per liter of water.

3. The process according to claim 2, wherein in step (i), the mushroom is present in the mixture at about 0.14 Kg to about 0.32 Kg per liter of water.

4. The process according to claim 1, wherein in step (i), the sugar is included in the mixture at about 0.13 Kg to about 0.47 Kg per liter of water.

5. The process according to claim 1, wherein in step (i), the sugar is included in the mixture at about 0.19 Kg to about 0.36 Kg per liter of water.

6. The process according to claim 1, comprising adding boiled peeled banana to the mixture in step (i).

7. The process according to claim 6, wherein the banana is included at about 0.05 to about 0.15 Kg per liter of water.

8. The process according to claim 7, wherein the banana is included at about 0.07 Kg to about 0.13 Kg per liter of water.

9. The process according to claim 1, comprising adding ginger to the mixture in step (i).

10. The process according to claim 9, wherein the ginger is included at about 0.003 to about 0.015 Kg per liter of water.

11. The process according to claim 10, wherein the ginger is included at about 0.005 to about 0.01 Kg per liter of water.

12. The process according to claim 1, wherein in step (ii), said acidic substance is citrus juice.

13. The process according to claim 12, wherein said citrus juice is lemon juice.

14. The process according to claim 1, comprising adding tannin or sulfur dioxide to the mixture in step (ii).

15. The process according to claim 1, comprising adding more sugar after step (v), until the specific gravity of the mixture is 1.030 to 1.020.

16. The process according to claim 15, wherein sugar is added in repeated increments to achieve increase in specific gravity of approximately 10 units each time.

17. The process according to claim 1, comprising adding a fining agent if the wine is cloudy after two to three months after fermentation has ceased.

18. The process according to claim 1, comprising adding sugar or syrup to the wine.

19. Wine produced by the process according to claim 1.

20. The process according to claim 1, wherein the mushroom is Enoki mushroom.

* * * * *